United States Patent [19]

Snider et al.

[11] 4,411,949
[45] Oct. 25, 1983

[54] POLYMERIC FOAMS FROM TRANSESTERIFIED BY-PRODUCT DERIVED FROM MANUFACTURE OF DIMETHYL TEREPHTHALATE AND LAMINATES THEREFROM

[75] Inventors: Scott C. Snider, Pinellas Park; Alberto DeLeon, Clearwater, both of Fla.

[73] Assignee: The Celotex Corporation, Tampa, Fla.

[21] Appl. No.: 344,459

[22] Filed: Feb. 1, 1982

[51] Int. Cl.$^3$ .................. C08G 18/14; B32B 3/26; B32B 31/14; B29C 23/00
[52] U.S. Cl. .................. 428/304.4; 156/78; 156/79; 252/182; 427/244; 427/373; 428/317.9; 428/422.8; 521/117; 521/124; 521/902; 521/131; 264/46.4; 264/45.8
[58] Field of Search .......... 521/902, 117, 124; 252/182; 156/79, 244, 373; 428/313, 315, 310, 304.4, 317.9

[56] References Cited

U.S. PATENT DOCUMENTS

| | | | |
|---|---|---|---|
| 3,553,172 | 1/1971 | Thoma et al. | 260/75 |
| 3,647,759 | 3/1972 | Walker | 260/75 |
| 3,655,820 | 4/1972 | Kaupp | 260/861 |
| 3,804,810 | 4/1974 | Fryd | 260/75 |
| 4,038,257 | 7/1977 | Suzuki et al. | 260/75 |
| 4,039,487 | 8/1977 | Kolakowski et al. | 260/2.5 AW |
| 4,100,354 | 7/1978 | Owen, Jr. | 560/89 |
| 4,184,022 | 1/1980 | Lawyer | 521/118 |
| 4,212,917 | 7/1980 | Skowronski et al. | 521/902 |
| 4,223,068 | 9/1980 | Carlstrom et al. | 428/310 |
| 4,233,408 | 11/1980 | Satterly et al. | 521/172 |
| 4,237,238 | 12/1980 | DeGuiseppi et al. | 521/131 |
| 4,246,365 | 1/1981 | Wiedermann et al. | 521/172 |
| 4,251,649 | 2/1981 | Hara et al. | 525/439 |
| 4,302,551 | 11/1981 | Horn et al. | 521/163 |

OTHER PUBLICATIONS

*DMT-HBR* (Preliminary Information), E. I. DuPont de Nemours & Co., Inc., Petrochemicals Department Discloses a High Boiling Fraction from the Manufacture of Dimethyl Terephthalate.
Hercules Inc., Bulletin OR-245, 245B (Wilmington, Delaware).

*Primary Examiner*—H. S. Cockeram
*Attorney, Agent, or Firm*—James W. Grace; Charles W. Vanecek

[57] ABSTRACT

Cellular foams, particularly polyisocyanurate foams, are prepared by reacting together an organic polyisocyanate, a blowing agent, a trimerization catalyst, and a minor amount of a polyol mixture prepared by the transesterification with a glycol of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials. Laminates of such foams exhibit a high degree of fire resistance, low smoke evolution on combustion, low foam friability and high compressive strength.

31 Claims, 3 Drawing Figures

U.S. Patent  Oct. 25, 1983  4,411,949
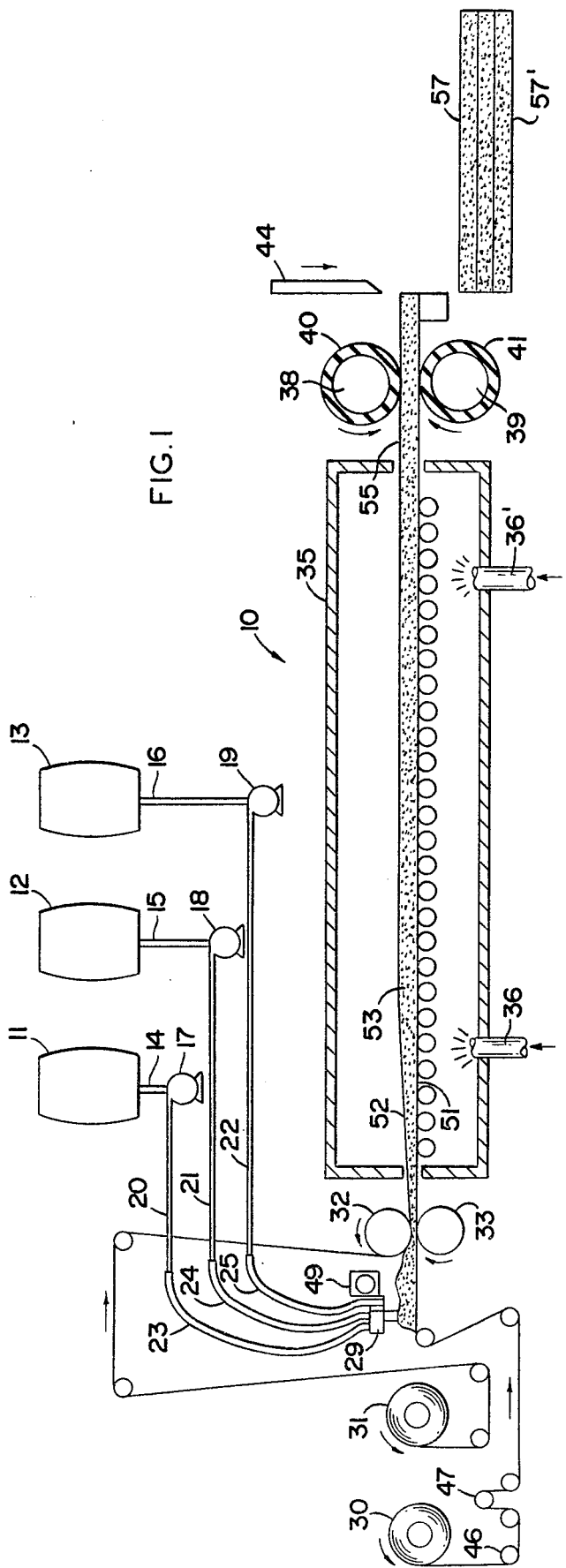
FIG.1
FIG.2
FIG.3

POLYMERIC FOAMS FROM TRANSESTERIFIED BY-PRODUCT DERIVED FROM MANUFACTURE OF DIMETHYL TEREPHTHALATE AND LAMINATES THEREFROM

BACKGROUND OF THE INVENTION

1. Field of the Invention

This invention relates to the preparation of cellular foam materials, particularly isocyanurate and urethane foams. The foams can be produced from an organic polyisocyanate and a polyol mixture comprising the transesterification product of a glycol with a fraction from the manufacture of dimethyl terephthalate.

2. Description of the Prior Art

The preparation of foams characterized by isocyanurate and urethane linkages is well known in the art. Generally, these foams are prepared by reacting an organic polyisocyanate with a polyol in the presence of a blowing agent and a catalyst(s). Polyester polyols of many types can be used as the polyol components in the production of these foams.

U.S. Pat. No. 4,039,487, for example, discloses the use of aromatic polyester polyols to prepare polyisocyanurate foams. Although the foams of this patent have good fire resistance and low smoke evolution upon combustion, they have a relatively high friability. Furthermore, the polyols are comparatively expensive to manufacture.

U.S. Pat. No. 4,092,276 also discloses the use of rather costly aromatic polyester polyols in preparing polyisocyanurate foams. Another disadvantage of these foams is that they do not have especially high compressive strength. A further problem with using aromatic polyester polyols, particularly those of low molecular weight, is that the polyols tend to be solid at room temperature, or to be characterized by very high viscosity and poor solubility in resin mixtures, thus making them difficult to handle.

To remedy the above drawbacks, it has been proposed in U.S. Pat. No. 4,237,238 to use in the preparation of polyisocyanurate foams a minor amount of a cheap by-product type of liquid polyol mixture which is obtained by the transesterification, with a glycol of molecular weight from about 60 to 400, of a dimethyl terephthalate esterified oxidate reaction product residue. This residue contains little to no dimethyl terephthalate. The polyisocyanurate foams produced are disclosed to be characterized by a high degree of fire resistance with low smoke evolution on combustion, a low foam friability and reasonably good compressive strength.

OBJECTS OF THE INVENTION

It is an object of the present invention to provide improved cellular foams, especially polyisocyanurate and polyurethane foams, having a combination of advantageous properties, including a reduced friability and high thermal stability and compressive strength, and a method of producing the foams.

It is another object of the present invention to provide an improved polyisocyanurate foam which is characterized by low friability and flammability and high compressive strength, and a method of producing the foam.

It is still another object of the present invention to produce polyisocyanurate foam materials characterized by a high degree of fire resistance with low smoke evolution and flame spread on combustion, and the formation of a protective intumescent char over unburnt foam upon combustion.

It is a further object of the present invention to provide polyisocyanurate foams from foam-forming materials which rapidly react to bring about a high conversion to trimer.

It is a still further object of the present invention to provide closed cell polymeric foam materials, especially polyisocyanurate foams, which can be used in building panels which are highly insulating, thermally resistant, low in friability, soundproof and self-supporting.

It is yet another object of the present invention to provide a polyol mixture for use in preparing polymeric foam materials, particularly polyisocyanurate foams, of reduced friability and high thermal stability and compressive strength, and a method of producing the polyol mixture.

These and other objects and advantages of the present invention will become more apparent by reference to the following detailed description and drawings wherein:

FIG. 1 is a side schematic representation of an apparatus suitable for producing a cellular foam material in accordance with the present invention;

FIG. 2 is a cross-sectional view of a laminated building panel having one facing sheet; and FIG. 3 is a cross-sectional view of a laminated building panel having two facing sheets.

DESCRIPTION OF THE INVENTION

The above objects have been achieved and the drawbacks of the prior art have been overcome by the development of an improved cellular polymer, which is prepared by reacting an organic polyisocyanate with the highly reactive polyester polyol of the present invention in the presence of a blowing agent and a catalyst(s). The polyester polyol comprises a polyol mixture prepared by the transesterification with a glycol of a fraction obtained from the production of dimethyl terephthalate, the major portion of said fraction comprising a mixture of dimethyl terephthalate, monomethyl terephthalate, bi-ring esters, and oligomers of the terephthalate and bi-ring esters.

The commercial production of dimethyl terephthalate employs p-xylene as a starting material and involves oxidation and esterification (with methanol) reactions. The process results in the formation of highly complex mixtures of products. U.S. Pat. No. 3,647,759 generally discloses the process and particularly describes the complex purged residue which is formed therein. This residue, which typically contains 0 to 6% by weight dimethyl terephthalate, is called "dimethyl terephthalate (DMT) esterified oxidate residue" in U.S. Pat. No. 3,647,759. The disclosure of this patent is incorporated herein by reference.

It is this dimethyl terephthalate esterified oxidate residue which is reacted with a glycol in U.S. Pat. No. 4,237,238 (referred to above under "Description of the Prior Art") to prepare the transesterified polyol mixture of said patent. Surprisingly, it has now been found that a more reactive polyol mixture than the one described in this prior art patent can be prepared by transesterifying with a glycol a fraction from the manufacture of dimethyl terephthalate which has a substantially higher content of dimethyl terephthalate than the purged residue of U.S. Pat. Nos. 3,647,759 and 4,237,238. Furthermore, polyisocyanurate foams prepared with a minor amount of this highly reactive transesterified polyol mixture of the present invention are found to possess superior compressive strengths which surpass those of the foams of U.S. Pat. No. 4,237,238.

By-products from dimethyl terephthalate production are highly complex and can vary widely in composition according to the conditions employed in the oxidation steps of the process, etc. However, the fraction found to be useful in the present invention possesses a general characteristic which serves to clearly distinguish it from the previously used residue by-products, viz. its aforementioned substantial dimethyl terephthalate content. Typically, dimethyl terephthalate can comprise about 15 to 70% by weight of this fraction, and preferably comprises about 20 to 60, more preferably 40 to 60, % by weight of the fraction. The dimethyl terephthalate is generally found in combination with about 1 to 10 weight % monomethyl terephthalate, the remainder of the fraction comprising a mixture of terephthalic acid, biphenyl and other phenyl esters, other substituted biphenyls, polymeric materials, and the catalyst(s) used to promote the oxidation and esterification reactions.

An especially useful high-boiling fraction from the manufacture of dimethyl terephthalate has the following approximate composition:

| Component | % By Weight |
| --- | --- |
| Dimethyl Terephthalate | 40-60 |
| Monomethyl Terephthalate | 1-10 |
| Terephthalic Acid | 1-2 |
| Bi-ring Esters[1] | 10-25 |
| Organic Acid Salts[2] | 5-12 |
| Ash | 1-4 |

[1]Mono-, di- and tri-carbomethoxy biphenyls and other substituted biphenyls.
[2]Mainly metal salts of aromatic carboxylic acids. The fraction at 25° C. is a black, malleable, oily solid, and has a softening point which typically ranges from about 90 to 150° C.

The transesterified polyol mixture of this invention is prepared by heating the by-product fraction defined above with a transesterifying glycol in accordance with the procedures described in U.S. Pat. No. 3,647,759, which is incorporated herein by reference. The transesterifying step is simply the replacement of the non-hydroxyl containing carbomethoxy groups in the various aromatic esters of the fraction by the glycol agents to yield terminal hydroxyl groups.

The transesterifying glycol can be aliphatic, cycloaliphatic or aromatic. Preferably, the glycol is an aliphatic dihydric alcohol which desirably has from 2 to 16 carbon atoms. The molecular weight of this preferred glycol advantageously ranges from about 60 to about 400. Examples of suitable glycols include ethylene, oxydiethylene, propylene, oxydipropylene, butylene, pentylene, and hexylene glycols, and isomeric forms thereof; the polyoxyalkylene glycols such as polyoxyethylene and polyoxypropylene glycols which advantageously have a molecular weight from about 150 to about 400; 1,8-octanediol, 1,4-bis-hydroxymethyl cyclohexane, 2-methyl-1,3-propanediol, dimethylol dicyclopentadiene, 1,3-cyclohexanediol, and 1,4-cyclohexanediol. The transesterifying glycols may, of course, be used as mixtures of several diols. The glycols may include substituents which are inert in the transesterification reaction, as, e.g., chlorine and bromine substituents.

Two preferred glycols are ethylene glycol and diethylene glycol, with the latter being more preferred.

The transesterification reaction is conveniently effected by admixing the by-product fraction from dimethyl terephthalate production with the glycol, which is preferably in excess of the quantity needed to react with the fraction on the basis of stoichiometry, and carrying out the reaction under normal transesterification conditions well known and described in the prior art. Illustratively, the transesterification can be conducted in the absence of a liquid reaction medium composed of material other than the glycol and by-product fraction under a flow of nitrogen and at atmospheric pressure and temperatures from about 150° C. to about 250° C. for a period from about one hour to about ten hours. Reaction is considered to be substantially complete when the formation of methanol ceases. During the reaction period, methanol which forms is removed.

The transesterification reaction is normally catalyzed. Generally, the fraction from the manufacture of dimethyl terephthalate has a catalyst content which is effective for transesterification, and which will promote the present reaction. However, if such a catalyst is not present or not enough of it is present, enough transesterification catalyst is added to the reaction mixture to suitably promote the reaction. Any conventional transesterification catalyst (single compound or mixture of compounds) can be used.

Although the transesterified polyol mixture of the invention can be employed without being filtered, it is preferred to filter the mixure prior to its subsequent utilization, such as in foam preparations. Alternatively, the by-product fraction can be filtered before it is transesterified. Metal salt removal is effected by the filtration.

The properties of the transesterified polyol mixtures of the present invention fall within rather broad ranges because of the complexity and variable nature of the dimethyl terephthalate containing fractions themselves. Accordingly, the viscosities (Brookfield) of the polyol mixtures measured in cps. at 25° C. fall within a rather broad range from about 500 to about 500,000, preferably about 500 to about 10,000, and most preferably about 700 to about 2,500; the hydroxyl number values fall within a range of from about 150 to about 950, preferably about 280 to about 650, and most preferably from about 350 to about 510; the acid number falls within a range of from about 0.2 to about 40 and preferably about 0.2 to about 10.

The glycol is preferably employed in excess in the transesterification reaction so that at the end of the reaction there is an excess of transesterifying glycol remaining in the polyol mixture of the invention. This excess can vary broadly but advantageously falls within a range of from about 5 to about 40 percent by weight of the polyol mixture.

A most preferred polyol mixture of the invention is characterized by a viscosity in cps. at 25° C. of about 700 to about 2500, a free diethylene glycol content of from about 10 to about 30 percent by weight of said mixture, a hydroxyl number within a range of from about 350 to about 468, and an acid number of about 0.2 to about 10.

Although the polyol mixtures of this invention can be readily produced as fluid materials, particularly by employing excess glycol transesterifying agent and leaving residual glycol in the mixtures, additional diluents can be employed with the polyol mixtures. Inert diluents can be employed, but it is usually preferred to employ liquid polyols. Therefore, in a preferred embodiment of the present invention, diols such as ethylene glycol, diethylene glycol, dipropylene glycol, or any of the other glycols set forth above as transesterifying agents may be added in a later step to reduce the viscosity of the polyol mixture.

For purposes of viscosity reduction, these diluents are generally employed in only minor amounts, as, e.g., in the range of about 1 to 40 percent, preferably about 5 to 30 percent, by weight of the polyol mixture. However, it is also within the scope of the present invention to form diol mixtures wherein the transesterifying glycol is present in greater amounts. The content of transesterifying glycol in the mixture can be progressively increased to the point where it is the major component and the transesterified mixture of the invention is present in only minor amount, as, e.g., in the range of about 1 to 20 percent by weight of the transesterifying glycol.

The polyol mixtures of the present invention may be used in the preparation of both cellular and non-cellular polymers. The latter polymers, such as the polyisocyanurates and polyurethanes, can be prepared by using standard techniques known to those skilled in the art. The polyol mixtures are particularly useful in the preparation of polyisocyanurate foams and polyurethane foams. These foams can be prepared by mixing together the organic polyisocyanate with the polyol mixture, catalyst and blowing agent at temperatures ranging from about 0° C. to 150° C.

In the broadest aspects of the present invention, any organic polyisocyanate can be employed in the preparation of the foams of the present invention. The organic polyisocyanates which can be used include aromatic, aliphatic and cycloaliphatic polyisocyanates and combinations thereof. Representative of these types are the diisocyanate such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotoluene 2,4- and 2,6-diisocyanate, naphthalene-1,5-diisocyanate, diphenylmethane-4,4'-diisocyanate, 4,4'-diphenylenediisocyanate, 3,3'-dimethoxy-4,4'-biphenyldiisocyanate, 3,3'-dimethyl-4,4'-biphenyldiisocyanate, and 3,3'-dimethyldiphenylmethane-4,4'-diisocyanate; the triisocyanates such as 4,4',4''-triphenylmethane-triisocyanate, polymethylenepolyphenyl isocyanate, toluene-2,4,6-triisocyanate; and the tetraisocyanates such as 4,4'-dimethyldiphenylmethane-2,2',5,5'-tetraisocyanate. Especially useful are polymethylenepolyphenyl isocyanates. These isocyanates are prepared by conventional methods known in the art such as the phosgenation of the corresponding organic amine.

The polyurethane foams can be prepared by reacting the polyol mixture of the invention and polyisocyanate on an essentially 1:1 to 1:1.2 equivalent basis. In an advantageous embodiment of the invention, the polyol mixture of the invention is employed in admixture with at least one other polyol to produce polyurethane foams. In this embodiment, the polyol mixture of the invention can comprise about 10 to 90, preferably about 20 to 50, weight percent of the total polyol content in the foam preparations.

The polyols which can be employed in combination with the polyol mixture of the invention in the preparation of the polyurethane foam compositions include, for example, monomeric polyols, such as ethylene glycol, the oxyalkylene adducts of polyol bases wherein the oxyalkylene portion is derived from a monomeric unit such as ethylene oxide, propylene oxide, butylene oxide and mixtures thereof. The polyol initiators include ethylene glycol, 1,2-propylene glycol, 1,3-propylene glycol, 1,2-butanediol, 1,4-butanediol, hexanetriol, glycerol, trimethylolpropane, triethylolpropane, pentaerythritol, sorbitol, sucrose, toluene diamine and bisphenol A, polyethers such as polyethylene ether glycols, polypropylene ether glycols, polytetramethylene ether glycols, and alkylene oxide adducts of polyhydric alcohols including those listed above; hydroxy terminated tertiary amines of the formula:

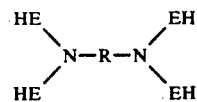

wherein R is an alkylene radical containing at least 2 to 6 carbon atoms and E is a polyoxyalkylene chain; amine based polyethers of the formula:

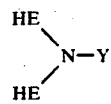

wherein E is a polyoxyalkylene chain and Y is selected from the group consisting of alkyl, hydroxyalkyl and EH; alkylene oxide adducts of acids of phosphorus such as the adducts prepared by the reaction of phosphoric acid and ethylene oxide, phosphoric acid and propylene oxide, phosphorus acid and propylene oxide, phosphonic acid and ethylene oxide, phosphinic acid and butylene oxide, polyphosphoric acid and propylene oxide and phosphonic acid and styrene oxide.

Typical polyether polyols include polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, and poly-1,4-oxybutylene and polyoxyethylene glycols, and random copolymer glycols prepared from blends or sequential addition of two or more alkylene oxides. Also adducts of the above with trimethylolpropane, glycerine and hexanetriol as well as the polyoxypropylene adducts of higher polyols such as pentaerythritol and sorbitol may be employed. Thus, the polyether polyols which can be employed in the present invention include oxyalkylene polymers which have an oxygen/carbon ratio from about 1:2 to 1:4 and preferably an oxygen carbon atom ratio from about 1:2.8 to 1:4 and from about 2 to 6 terminal hydroxyl groups, preferably about 2 to 4 terminal hydroxyl groups. The polyether polyols generally have an average equivalent weight from about 80 to 10,000 and preferably have an average equivalent weight from about 100 to about 6000. Polyoxypropylene glycols having molecular weights from about 200 to about 4000 corresponding to equivalent weights from about 100 to 2000 and mixtures thereof are particularly useful as polyol reactants. Polyol blends such as a mixture of high molecular weight polyether polyols with lower molecular weight polyether polyols or monomeric polyols can also be employed.

Any suitable hydroxy terminated polyester may also be used in combination with the polyol mixture of the invention. These can be obtained from the reaction of polycarboxylic acids and polyhydric alcohols. Such suitable polycarboxylic acids may be oxalic acid, malonic acid, succinic acid, glutaric acid, adipic acid, pimelic acid, suberic acid, azelaic acid, sebacic acid, basilic acid, thapsic acid, maleic acid, fumaric acid, glutaconic acid, isophthalic acid and terephthalic acid. Suitable polyhydric alcohols include the following: ethylene glycol, 1,2-propylene glycol, 1,3-propylene glycol, 1,2-butylene glycol, 1,3-butylene glycol, 1,4-butylene glycol, 1,3-pentanediol, 1,4-pentanediol, 1,5-pentanediol, 1,6-hexanediol, 1,4-hexanediol, glycerol, trimethylolpropane, trimethylolethane, hexane 1,2,6-triol, α-methylglucoside, pentaerythritol, sorbitol, sucrose, and compounds derived from phenols such as 2,2-bis(4-hydroxyphenol) propane.

In addition to the above hydroxy-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

Any blowing agent typically employed in similar prior art foam products containing polyisocyanurate and/or polyurethane linkages can be employed in the foam compositions of the present invention. In general, these blowing agents are liquids having a boiling point between minus 50° C. and plus 100° C. and preferably between 0° C. and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_3$, diethylether, isopropyl ether, n-pentane, cyclopentane, and 2-methylbutane. Combinations of trichlorofluoromethane plus 1,1,2-trichloro-1,2,2-trifluoroethane, are the preferred blowing agents. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20 weight percent of the composition. When the blowing agent has a boiling point at or below ambient, it is maintained under pressure until mixed with the other components. Alternatively, it can be maintained at subambient temperatures until mixed with the other components.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade name "DC-193". Other suitable surfactants are those described in U.S. application Ser. No. 282,322, filed July 10, 1981. Included among the latter surfactants is the product supplied by Jim Walter Resources, Inc. under the trade designation "CGS-100." Generally, the surfactant comprises from about 0.05 to 10, and preferably from 0.1 to 6, weight percent of the foam-forming composition.

Suitable catalysts for the foam preparations include dibutyltin dilaurate, dibutyltin diacetate, stannous octoate, lead octoate, and cobalt naphthenate. The catalysts generally comprise from 0.1 to 20 and preferably from 0.3 to 10 weight percent of the total composition.

Other additives may also be included in the foam formulations. Included are flame-retardants, such as tris(2-chloroethyl)-phosphate, dispersing agents, plasticizers, fillers and pigments.

In a preferred rigid foam of the invention containing polyisocyanurate linkages, the organic polyisocyanate is polymethylene polyphenylisocyanate. The polymethylene polyphenylisocyanates desirably have a functionality of at least 2.1 and preferably 2.5 to 3.2. These preferred polymethylene polyphenylisocyanates generally have an equivalent weight between 120 and 180 and preferably have an equivalent weight between 130 and 145. The friability of foams made with these polyisocyanates is desirably less than 30%, preferably less than 20%.

A preferred subclass of polymethylene polyphenylisocyanates especially useful in the present invention is a mixture of those of the following formula:

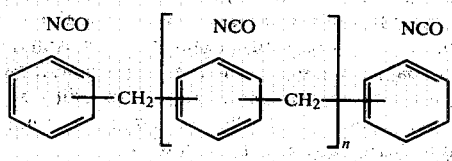

wherein n is an integer from 0 to 8 and wherein the mixture has the above-described functionality and equivalent weight. This mixture should have a viscosity between 100 and 4,000 and preferably 250 to 2500 centipoises measured at 25° C. in order to be practical for use in the present invention.

Examples of suitable polymethylene polyphenylisocyanates useful in the present invention include those of the above formula, wherein n is 1 as well as mixtures wherein n can have any value from 0 to 8 as long as the mixture has the specified equivalent weight. One such mixture has 40 weight percent of n=0, 22 weight percent of n=1, 12 weight percent of n=2, and 26 weight percent of n=3 to about 8. The preferred polymethylene polyphenyl isocyanates are described in U.S. application Ser. No. 322,843, filed Jan. 11, 1973, now abandoned. The synthesis of polymethylene polyphenylisocyanates is described in Seeger et al., U.S. Pat. No. 2,683,730 and in Powers U.S. Pat. No. 3,526,652 at column 3, lines 6-21. It should, therefore, be understood that the polymethylene polyphenylisocyanates available on the market under the tradenames of CODE 047 or PAPI-20 (Upjohn) and MR 200 (Mobay) can successfully be employed within the spirit and scope of the present invention.

In order to ensure complete reaction, the polymethylene polyphenylisocyanate and the polyol mixture are generally mixed in an equivalent ratio of 1.5:1 to 6:1 and preferably 2:1 to 5:1. In ranges outside these proportions the reaction yields a product having undesirable physical characteristics. At higher ratios the product has an undesirable high friability. At lower ratios the product has an undesirably high flammability.

In the preparation of these polyisocyanurate rigid foams, any catalysts known to catalyze the trimerization of isocyanates to form isocyanurates, and to catalyze the reaction of isocyanate groups with hydroxyl groups to form polyurethanes, can be employed. The preferred catalysts give cream times of 15 to 30 seconds and firm times of 25 to 80 seconds. One preferred type of catalyst is a mixture of a tertiary amino phenol, such as 2,4,6-tris(dimethylaminomethyl)phenol, and an alkali metal carboxylate, such as potassium-2-ethyl hexoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition is desirably about 0.4:1 to 2.5:1. Another catalyst system is that employing an epoxide, an N-substituted aziridine, and a tertiary amine. The synthesis and use of such a catalyst are described in U.S. application Ser. No. 251,279, filed May 8, 1972, now U.S. Pat. No. 3,799,896. The catalysts generally comprise from 0.1 to 20 and preferably from 0.3 to 10 weight percent of the total composition.

Referring now to the drawings, and in particular to FIG. 1, there is shown schematically an apparatus 10 suitable for use in connection with the present invention. The apparatus 10 comprises an isocyanate tank 11, a polyol tank 12, and a catalyst tank 13, each respectively connected to outlet lines 14, 15, and 16. The lines 14, 15, and 16 form the inlet to metering pumps 17, 18, and 19. The pumps 17, 18, and 19 discharge respectively through lines 20, 21, and 22 which are in turn respectively connected to flexible lines 23, 24, and 25. The flexible lines 23, 24, and 25 discharge to mixing head 29. The apparatus 10 is also provided with a roll 30 of lower substrate material and a roll 31 of upper substrate material. The apparatus 10 is also provided with metering rolls 32 and 33, and an oven 35 provided with vents 36, 36' for blowing hot air. The apparatus 10 is also provided with pull rolls 38, 39 and cutting knife 44.

In operation, the isocyanate tank 11 is charged with the organic polyisocyanate admixed with the blowing agent and the surfactants, and the polyol tank 12 is charged with the polyol mixture of the invention, and the catalyst tank 13 is charged with the catalyst composition. The speeds of the pumps 17, 18, and 19 are adjusted to give the desired ratios of the ingredients in the tanks 11, 12, and 13. These ingredients pass respectively through lines 20, 21, and 22 as well as lines 23, 24, and 25, whereupon they are mixed in the mixing head 29 and discharged therefrom. Alternatively, lines 21 and 22 can be combined prior to the mixing head. The pull rolls 38, 39, each of which has a flexible outer sheath 40, 41 are caused to rotate in the direction of the arrows by a power source (not shown). By virtue of rotation of the pull rolls 38, 39 lower substrate material is pulled from the roll 30, whereas upper substrate material is pulled from the roll 31. The substrate material passes over idler rollers such as idler rollers 46 and 47 and is directed to the nip between metering rolls 32, 33. The mixing head 29 is caused to move back and forth, i.e. out of the plane of the paper by virtue of its mounting on reversible mechanism 49. In this manner, an even amount of material can be maintained upstream of the nip between the metering rolls 32, 33. The composite structure at this point now comprising a lower substrate 51, an upper substrate 52 on either side of a core 53, now passes into the oven 35. While in the oven 35 the core expands under the influence of heat added by the hot air from vents 36, 36' and due to the heat generated in the exothermic reaction between the polyol mixture and the isocyanate in the presence of the catalyst. The temperature within the oven is controlled by varying the temperature of the hot air from vents 36, 36', in order to insure that the temperature within the oven 35 is maintained within the herein described limits. The composite structure 55 then leaves the oven 35, passes between the nip of the pull rolls 38, 39 and is cut by knife 44 into individual panels 57, 57'.

Numerous modifications to the apparatus 10 will be immediately apparent to those skilled in the art. For example, the tanks 11, 12, and 13 can be provided with refrigeration means in order to maintain the reactants at subambient temperatures.

Referring to FIG. 2 of the drawings, there is shown a laminated building panel 60 of the invention. The building panel 60 comprises a single facing sheet 61 having thereon a cellular material 62 of the present invention. FIG. 3 shows a building panel 70 having two facing sheets 71 and 72 on either side of a cellular material 73.

Any facing sheet previously employed to produce building panels can be employed in the present invention. Examples of suitable facing sheets include, among others, those of kraft paper, aluminum, and asphalt impregnated felts, as well as laminates of two or more of the above.

The foam materials of the invention can also be used, with or without a facer(s), for pipe insulation.

The foam materials of the invention can contain various reinforcement materials, such as a quantity of glass fibers, as described in U.S. Pat. Nos. 4,118,533 and 4,284,683, the disclosures of which are hereby incorporated by reference.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

Preparation of Transesterified Polyol Mixtures

This example illustrates the preparation of various transesterified polyol mixtures of the present invention.

A dimethyl terephthalate (DMT) containing by-product fraction (DMT-HBR) from the manufacture of dimethyl terephthalate, which is supplied by E. I. duPont de Nemours & Co., Inc. under the trade designation "DMT-HBR," was subjected to a series of three transesterification reactions utilizing diethylene glycol (DEG) as the transesterifying glycol in each reaction to produce Polyol Mixtures A, B and C of the present invention (See Table I below). The quantities of the ingredients employed in each reaction, including the quantity of catalyst, are set forth in Table I below. Each reaction was conducted under a nitrogen purge at a temperature of 180°–230° C. to produce the quantity of methanol shown in Table I. In Reaction No. 1, 66 grams of diethylene glycol were vacuum distilled from the transesterified polyol mixture.

The transesterified polyol mixture produced by Reaction No. 3 (Polyol Mixture C) was determined to contain 7.8 weight % solids, based on the weight of DMT-HBR, after filtration at 100° C. A 5% solids content (fine gray powder) was found after a methylene chloride wash. The solids were determined to consist of manganese and cobalt salts of terephthalic acid.

Some further properties of the transesterified polyol mixtures produced are shown at the bottom of Table I. It can be seen that the physical state of the resulting polyol mixture can be changed from a glass to a liquid by employing a greater excess of diethylene glycol in the transesterification reaction.

TABLE I

| REACTION No. | 1 | 2 | 3 |
|---|---|---|---|
| Grams Charged | | | |
| DMT-HBR | 412 | 412 | 400 |
| DEG | 286 | 318 | 496 |
| TBT[1] | 0.08 | 0.08 | 0.2 |
| EST. MOLE RATIO[2] (DEG/DMT-HBR) | 1.8 | 2.0 | 3.2 |
| Grams Removed | | | |
| METHANOL (contains DMT) | 107 | 115 | 112 |
| DEG (vacuum distilled) | 66 | (no) | (no) |
| TRANSESTERIFIED POLYOL MIXTURE | A | B | C |
| Appearance | BLACK GLASS | BLACK VISCOSE LIQUID | BLACK LIQUID |
| Hydroxyl Value | 72 | 247 | 510 |
| Equiv. Weight | 780 | 227 | 110 |
| Free DEG, wt % | — | 8 | — |
| Viscosity @ 25° C, cps | — | 120M | 3150 |

[1]TBT = Tetrabutyl titanate catalyst, supplied by E. I. duPont de Nemours & Co., Inc. under the trademark "Tyzor TBT".
[2]Estimated mole ratio is based on saponification value of DMT-HBR fraction and molecular weight of DEG.

EXAMPLE 2

Preparation of Transesterified Polyol Mixtures

This example illustrates the preparation of four further transesterified polyol mixtures of the present invention.

Four by-product fractions (DMT-HBR) from the manufacture of dimethyl terephthalate supplied by E. I. du Pont de Nemours & Co., Inc. were transesterified in accordance with the present invention to produce Polyol Mixtures D, E, F and G of the present invention. The proportions (in parts by weight) of the ingredients employed in each reaction and various properties of the four transesterified polyol mixtures produced are presented in Table II. Each reaction was conducted at a temperature of 180°–230° C.

TABLE II

| REACTION No. | Equiv. Wt.[1] | 1 | 2 | 3 | 4 |
|---|---|---|---|---|---|
| Parts Charged | | | | | |
| DMT-HBR Fraction 1 | 133.1 | .49 | — | — | — |
| DMT-HBR Fraction 2 | 111.1 | — | .53 | — | — |
| DMT-HBR Fraction 3 | — | — | — | .53 | — |
| DMT-HBR Fraction 4 | — | — | — | — | .53 |
| DEG | 53 | .64 | .62 | .62 | .62 |
| Parts Removed | | | | | |
| METHANOL/WATER MIXTURE | | .14 | .13 | — | — |
| TRANSESTERIFIED POLYOL MIXTURE | | D | E | F[2] | G[2] |
| Appearance | | DARK LIQUID | DARK LIQUID | DARK LIQUID | DARK LIQUID |
| Hydroxyl Value | | 448 | 400 | 377 | 369 |
| Equiv. Weight | | 125 | 140 | 149 | 152 |
| Acid Number | | — | 0.4 | 7 | 6 |
| Viscosity @ 25° C., cps | | 770 | 1280 | 1600 | 1900 |

TABLE II-continued

| Solids Content, wt % | .05 | .06 | — | — |

[1]Equivalent Weight determined from saponification value.
[2]Transesterified polyol mixture was filtered after transesterification.

EXAMPLE 3

This example illustrates the synthesis of four polyisocyanurate foams utilizing transesterified Polyol Mixture E of Example 2. Four comparative foams were also prepared using the same procedure and ingredients employed in synthesizing the inventive foams except that the transesterified polyol mixture of the invention was replaced with an aromatic polyester polyol mixture supplied by Hercules Inc. under the trademark "Terate 202".

In the preparation of each foam, the following quantities of the following ingredients were combined as indicated.

| | | Quantity | |
|---|---|---|---|
| Item | Ingredient | Grams | Equivalents |
| A | polymethylene polyphenyl isocyanate | 230 | 1.67 |
| B | monofluorotrichloromethane | 50 | — |
| C | L-5340 | 2.0 | — |
| D | polyol mixture (See Table III below) | 70 | .5 |
| E | 2,4,6-tris(dimethylaminomethyl) phenol | | (See below) |
| F | potassium-2-ethyl hexoate (70% solution in G) | | (See below) |
| G | polyoxyethylene glycol | | (See below) |

Each foam was prepared using a Hennecke foam metering and dispensing machine. Items A, B and C were premixed together, metered and injected into one side of the high pressure impingement mixing chamber of the machine. Items E, F and G were premixed together in a container. A metered amount of this catalyst mixture, and a metered amount of item D were injected into the other side of the high pressure impingement mixing chamber. After mixing, all ingredients were dispensed into a 12"×12"×6" box, yielding a polyisocyanurate foam. The cream time, firm time, and tack free time of each foam are reported in Table III.

Various additional characteristics of the foams produced are also shown in the following Table III.

In the above syntheses, Item A is a polymethylene polyphenyl isocyanate having an equivalent weight of 138, an acidity of 0.03% HCl, and a viscosity of 2000 centipoises at 25° C. and is available from the Mobay Chemical Company, Pittsburgh, Pa. under the trade name MONDUR MR-200.

L-5340 is a silicone surfactant available from the Union Carbide Corporation.

Item E is that supplied by the Rohm & Haas Chemical Company under the trade name DMP-30.

Item F is employed in the form of a 70 weight % solution in the polyoxyethylene glycol (Item G) sold by the Union Carbide Corporation under the trade name Carbowax 200.

The catalyst mixture of Items E, F and G added in the above-described foam preparations is a blend of DMP-30: potassium-2-ethyl hexoate:polyoxyethylene glycol in a 0.84:2.50:6.66 weight ratio.

TABLE III

PROPERTIES OF POLYISOCYANURATE FOAMS

| Foam | Polyol | Catalyst Mixture (Weight %[1]) | Cream Time (sec.) | Firm Time (sec.) | Tack Free Time (sec.) | Density (pcf) | Friability (% wt. loss, 10 min.)[2] | Compressive Strength (psi), parallel to rise[3] | % Closed Cells | Oxygen Index (OI)[4] | Initial K-Factor[5] |
|---|---|---|---|---|---|---|---|---|---|---|---|
| A | Polyol Mixture E | 2.87 | 20 | 45 | 46 | 1.83 | 10.2 | 34.4 | 89.6 | 25.1 | 0.112 |
| B | Terate 202 | 3.56 | 20 | 56 | 57 | 1.85 | 2.1 | 26.2 | 89.2 | 23.6 | 0.115 |
| C | Polyol Mixture E | 2.41 | 26 | 62 | 65 | 1.85 | 8.1 | 32.4 | 90.3 | 24.8 | 0.111 |
| D | Terate 202 | 2.52 | 28 | 76 | 78 | 1.88 | 2.7 | — | 89.8 | — | 0.111 |
| E | Polyol Mixture E | 3.77 | 14 | 31 | 32 | 1.85 | 7.8 | — | 90.9 | — | 0.114 |
| F | Terate 202 | 4.66 | 13 | 30 | 31 | 1.83 | 0.4 | — | 91.2 | — | 0.116 |
| G | Polyol Mixture E | 2.82 | 21 | 49 | 52 | 1.85 | 11.5 | 31.8 | 89.5 | 24.8 | 0.115 |
| H | Terate 202 | 3.08 | 21 | 58 | 57 | 1.80 | 4.2 | 23.4 | 89.4 | 23.8 | 0.117 |

[1] Of total foam-forming composition.
[2] According to ASTM Test Method C-421.
[3] According to ASTM Test Method D-1621-73.
[4] Flammability test conducted according to ASTM D-2863.
[5] Units = Btu-iin/hr-ft$^2$-°F.

The Table III results show that the polyol mixture of the invention is substantially more reactive than the comparative polyol mixture. Less catalyst is required to promote the reaction in the case of the inventive foams. Furthermore, use of the polyol mixture of the invention leads to a process efficiency, with faster firm times at the same cream time resulting in an increased output.

The results also show that the inventive foams are characterized by a compressive strength which is significantly higher than that of the comparative foams.

EXAMPLE 4

This example illustrates the process of the present invention in the production of two inventive foams on a commercial scale by reference to FIG. 1 of the drawings. Two comparative foams were also produced utilizing Terate 202 as the polyol component.

A. PRODUCTION OF LAMINATED STRUCTURAL PANEL

The following quantities of the following ingredients were combined as indicated:

| Item | Ingredient | Parts by Weight |
|---|---|---|
| A | Polymethylene polyphenyl isocyanate | 230 |
| B | CFCl$_3$ | 50 |
| C | Polyol Mixture (See Table IV below) | 70 |
| D | L-5340 | 2 |
| E | Catalyst mixture of Example 3 | 10 |

Items A, B, and D were mixed with each other and placed in the tank 11. Item C was placed in the tank 12. Item E was placed in the tank 13. The apparatus 10 was provided with aluminum foil/aluminum foil, kraft paper, aluminum foil trilaminate rolls 30, 31. The oven 35 was heated to a temperature of 150°-200° F. The rolls 38, 39 were started, as well as the pumps 17, 18, and 19 to discharge the contents of the tanks 11, 12, 13 into the respective feed lines which carry the ingredients to the mixing head 29. The mixing head 29 deposited the foam forming mixture onto the lower substrate and both upper and lower substrates and foamable mixture were then conveyed into the oven 35 to produce a laminated structural panel 55 of the present invention.

In the above foam syntheses, the polymethylene polyphenyl isocyanate is that supplied by the Mobay Chemical Company under the trade name MONDUR MR-200.

L-5340 is a silicone surfactant available from the Union Carbide Corporation.

Various properties of the resulting faced polyisocyanurate foams are reported in Table IV below.

B. DETERMINATION OF % CONVERSION TO TRIMER IN ISOCYANURATE FOAMS

Each of the foams of this example was tested to determine its residual isocyanate in accordance with the following procedure:

PROCEDURE 1. 0.2-0.5 gram of foam (in duplicate), grated with a #16 mesh Nichrome wire screen, was weighed into a 125 ml Erlenmeyer flask. 2. 5 ml of dry di-n-butylamine solution$^a$ was pipetted into the flask, wetting the entire sample but not the sides of the flask. 3. 5 ml of dry DMF (N,N-dimethylformamide) was pipetted into the flask. Any amine solution on the side of the flask was carefully washed down and the flask was stoppered with a cork immediately. 4. Steps 2 and 3 were repeated for a reagent blank. 5. The flasks were allowed to stand 30 minutes; then 50 ml of water was added from a graduated cylinder. 6. 5 drops of methyl red indicator were added and the excess amine was titrated with a standardized 0.1 N HCl solution to the pink end point (yellow to pink).

CALCULATIONS:

$$\% \text{ NCO} = \frac{(\text{ml blank} - \text{ml sample}) (\text{normality HCl}) (4.2)^b}{\text{wt sample (gm)}} - 0.33^b$$

where:

% NCO = percent isocyanate content in the foam ml
blank = the volume of HCl added to the blank ml
sample = the volume of HCl added to the sample a. Di-n-butylamine solution made by pipetting 5 ml into a 100 ml volumetric flask and diluting to volume with dry DMF.

b. The factor 0.33 is the sample blank that has been treated with methanol, water and high temperature to minimize the residual isocyanate content. The 4.2 factor converts m-moles of NCO to grams NCO and includes the factor of 100 for converting weight ratio to percent.

The % residual isocyanate determined for each foam was subtracted from the % isocyanate available for trimerization in the foam-forming composition, and the result is reported in Table IV below as % conversion to trimer.

The Table IV results show that the inventive foams are characterized by a % conversion to trimer which is significantly higher than that of the comparative foams.

TABLE IV
PROPERTIES OF FACED POLYISOCYANURATE FOAMS

| Foam | Polyol Mixture | % Conversion to Trimer | Density (pcf) | % Closed Cells | TUNNEL TEST[1] Flame Spread | Smoke Developed |
|---|---|---|---|---|---|---|
| A | Terate 202 | 55.8 | 1.86 | 91.7 | 25 | 75 |
| B | Polyol Mixture F[2] | 76.2 | 1.72 | 90.8 | 25 | 75 |
| C | Terate 202 | 57.2 | 1.89 | 91.7 | — | — |
| D | Polyol Mixture F[2] | 76.9 | 1.73 | 90.9 | — | — |

[1] ASTM E-84 Test on ½" to 3" thick sample.
[2] Of Example 2.

Whereas the present invention has been described with respect to specific embodiments thereof, it should be understood that the invention is not limited thereto, as many modifications thereof may be made. It is, therefore, contemplated to cover by the present application any and all such modifications as fall within the true spirit and scope of the appended claims.

We claim:

1. A polyisocyanurate foam comprising the reaction product of an organic polyisocyanate, a blowing agent, a trimerization catalyst, and a minor amount of a polyol mixture prepared by the transesterification, with a glycol of molecular weight from about 60 to 400, of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials.

2. The polyisocyanurate foam of claim 1 wherein said organic polyisocyanate is a polymethylene polyphenylisocyanate.

3. The polyisocyanurate foam of claims 1 or 2 wherein said transesterifying glycol is a member selected from the group consisting of ethylene glycol, diethylene glycol, propylene glycol and dipropylene glycol.

4. The polyisocyanurate foam of claim 1 wherein said transesterifying glycol is diethylene glycol.

5. The polyisocyanurate foam of claim 1 wherein said organic polyisocyanate is a mixture of components of the formula

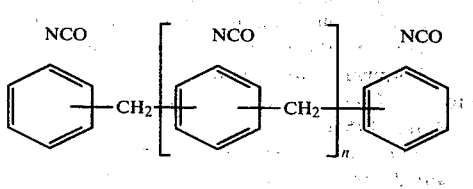

wherein n is an integer from 0 to 8 inclusive, and said mixture has:
 (a) a functionality of 2.1 to 3.2,
 (b) an equivalent weight between 120 and 180, and
 (c) a viscosity at 25° C. between 150 and 2500 centipoises.

6. The polyisocyanurate foam of claim 1 wherein said transesterifying glycol is an aliphatic dihydric alcohol having 2 to 16 carbon atoms.

7. The polyisocyanurate foam of claim 1 wherein said by-product fraction from the manufacture of dimethyl terephthalate comprises a mixture of
 (a) about 40 to 60 percent by weight of dimethyl terephthalate,
 (b) about 1 to 10 percent by weight of monomethyl terephthalate,
 (c) about 1 to 2 percent by weight of terephthalic acid,
 (d) about 10 to 25 percent by weight of bi-ring esters,
 (e) about 5 to 12 percent by weight of organic acid salts,
 (f) about 18 to 25 percent by weight of polymeric materials, and
 (g) about 1 to 4 percent by weight of ash.

8. The polyisocyanurate foam of claims 1, 2 or 6 wherein said polyol mixture includes glycol added after the transesterification reaction.

9. The polyisocyanurate foam of claims 1, 2 or 6 wherein the equivalent ratio of said organic polyisocyanate to said polyol mixture is about 1.5:1 to 6:1.

10. The polyisocyanurate foam of claim 9 wherein said transesterifying glycol is a member selected from the group consisting of ethylene glycol and diethylene glycol.

11. The polyisocyanurate foam of claim 10 wherein said transesterifying glycol is diethylene glycol and said polyol mixture is characterized by a viscosity in cps at 25° C. of about 700 to 2500, a free diethylene glycol content of from about 10 to 30 percent by weight of said mixture, a hydroxyl number within a range of from about 350 to 468, and an acid number of about 0.2 to 10.

12. The polyisocyanurate foam of claim 1 which comprises the reaction product of a polymethylene polyphenylisocyanate, a fluorocarbon blowing agent, a trimerization catalyst, and a polyol mixture prepared by the transesterification, with ethylene glycol or diethylene glycol, of a by-product fraction from the manufacture of dimethyl terephthalate, the major portion of said fraction comprising about 40 to 60 weight percent of dimethyl terephthalate, and about 60 to 40 weight percent of a mixture of monomethyl terephthalate, bi-ring esters and polymeric materials, and the equivalent ratio of said polymethylene polyphenylisocyanate to said polyol mixture being about 1.5:1 to 6:1.

13. The polyisocyanurate foam of claim 12 wherein said transesterifying glycol is diethylene glycol and said polyol mixture is characterized by a viscosity in cps at 25° C. of about 700 to 2500, a free diethylene glycol content of from about 10 to 30 percent by weight of said mixture, a hydroxyl number within a range of from about 350 to 468, and an acid number of about 0.2 to 10.

14. The polyisocyanurate foam of claims 12 or 13 wherein said trimerization catalyst comprises a mixture of a tertiary amino phenol and an alkali metal carboxylate.

15. The polyisocyanurate foam of claim 14 wherein said trimerization catalyst comprises a mixture of 2,4,6-tris(dimethylaminomethyl) phenol and potassium-2- ethyl hexoate in an equivalent ratio of about 0.4:1 to 2.5:1.

16. A process for producing a polyisocyanurate foam comprising reacting together under foam-forming conditions an organic polyisocyanate, a blowing agent, a trimerization catalyst, and a minor amount of a polyol mixture prepared by the transesterification, with a glycol of molecular weight from about 60 to 400, of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials.

17. A laminate comprising at least one facing sheet adhered to a polyisocyanurate foam which comprises the reaction product of an organic polyisocyanate, a blowing agent, a trimerization catalyst, and a minor amount of a polyol mixture prepared by the transesterification, with a glycol of molecular weight from about 60 to 400, of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials.

18. The laminate of claim 17 wherein said polyisocyanurate foam is reinforced by glass fibers.

19. A process for producing a laminate comprising
    (a) contacting a facing sheet with a polyisocyanurate foam-forming mixture comprising an organic polyisocyanate, a blowing agent, a trimerization catalyst, and a minor amount of a polyol mixture prepared by the transesterification, with a glycol of molecular weight from about 60 to 400, of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials, and
    (b) foaming said foam-forming mixture.

20. In a polyurethane foam which comprises the reaction product of an organic polyisocyanate, a blowing agent, a catalyst and a polyol, the improvement comprising about 20 to 50 percent of the weight of said polyol being a polyol mixture prepared by the transesterification, with a glycol of molecular weight from about 60 to 400, of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials.

21. A polyol mixture comprising the reaction product obtained by transesterifying, with a glycol of molecular weight from about 60 to 400, a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials.

22. The polyisocyanurate foam of claim 1 wherein said blowing agent is a halohydrocarbon.

23. The laminate of claim 17 wherein said blowing agent is a halohydrocarbon.

24. The polyol mixture of claim 21 wherein said transesterifying glycol is a member selected from the group consisting of ethylene glycol, diethylene glycol, propylene glycol and dipropylene glycol.

25. The polyol mixture of claim 21 wherein said transesterifying glycol is diethylene glycol.

26. The polyol mixture of claim 21 wherein said polyol mixture includes glycol added after the transesterification reaction.

27. The polyol mixture of claim 21 wherein said transesterifying glycol is diethylene glycol and said polyol mixture is characterized by a viscosity in cps at 25° C. of about 700 to 2500, a free diethylene glycol content of from about 10 to 30 percent by weight of said mixture, a hydroxyl number within a range of from about 350 to 468, and an acid number of about 0.2 to 10.

28. The polyol mixture of claim 21 wherein said transesterifying glycol is an aliphatic dihydric alcohol having 2 to 16 carbon atoms.

29. The polyol mixture of claim 28 wherein said by-product fraction from the manufacture of dimethyl terephthalate comprises a mixture of
    (a) about 40 to 60 percent by weight of dimethyl terephthalate,
    (b) about 1 to 10 percent by weight of monomethyl terephthalate,
    (c) about 1 to 2 percent by weight of terephthalic acid,
    (d) about 10 to 25 percent by weight of bi-ring esters,
    (e) about 5 to 12 percent by weight of organic acid salts,
    (f) about 18 to 25 percent by weight of polymeric materials, and
    (g) about 1 to 4 percent by weight of ash.

30. The polyol mixture of claim 29 wherein said transesterifying glycol is a member selected from the group consisting of ethylene glycol and diethylene glycol.

31. The polyol mixture of claim 30 wherein said transesterifying glycol is diethylene glycol and said polyol mixture is characterized by a viscosity in cps at 25° C. of about 700 to 2500, a free diethylene glycol content of from about 10 to 30 percent by weight of said mixture, a hydroxyl number within a range of from about 350 to 468, and an acid number of about 0.2 to 10.

* * * * *